United States Patent

Erhard et al.

[15] 3,640,679

[45] Feb. 8, 1972

[54] PROCESS FOR RECOVERY OF COLUMBIUM

[72] Inventors: Albert E. Erhard, Denver; Jack B. Allison, Lakewood, both of Colo.

[73] Assignee: Molybdenum Corporation of America, New York, N.Y.

[22] Filed: Dec. 17, 1969

[21] Appl. No.: 885,965

Related U.S. Application Data

[63] Continuation-in-part of Ser. No. 797,265, Feb., 1969, abandoned.

[52] U.S. Cl. .................................23/15 R, 23/18, 23/24, 23/19, 23/23, 23/140
[51] Int. Cl. .................................................C22b 59/00
[58] Field of Search.........................23/15, 18–20, 22–24, 23/51, 140; 75/121

[56] References Cited

UNITED STATES PATENTS

| | | | |
|---|---|---|---|
| 2,481,584 | 9/1949 | Fowler | 23/19 |
| 2,819,945 | 1/1958 | Ruhoff et al. | 23/18 |
| 2,953,453 | 9/1960 | Foos | 75/121 |
| 3,003,867 | 10/1961 | Lerner | 23/18 X |
| 3,058,825 | 10/1962 | Cardon | 23/18 X |
| 3,107,976 | 10/1963 | Koerner et al. | 23/19 |

*Primary Examiner*—Herbert T. Carter
*Attorney*—Morgan, Finnegan, Durham & Pine

[57] ABSTRACT

An improved process for recovery and purification of columbium values from columbium concentrates or ores comprises either (I) baking a concentrate with sulfuric acid; aqueously leaching the acid-baked concentrate; and fixing or conditioning the leached concentrate with ammonia or an alkali metal hydroxide; or (II) heating and fixing the concentrate with an excess of an alkali metal hydroxide; aqueously leaching the products of Steps (I) or (II) to produce an aqueous solution containing fixed columbium values and recovering the columbium values from the solution.

13 Claims, No Drawings

PROCESS FOR RECOVERY OF COLUMBIUM

REFERENCE TO RELATED APPLICATIONS

This application is a continuation-in-part of copending application Ser. No. 797,265, filed Feb. 6, 1969, now abandoned.

This invention relates to recovery and purification of columbium values from columbium-containing materials. More particularly, it concerns preparing columbium-containing materials so that they will provide highly concentrated stock solutions.

BACKGROUND OF THE INVENTION

Columbium occurs in many minerals, the most common being columbite and pyrochlore. Columbite is a complex ferrous or manganous columbate-tantalate with the $Cb_2O_5$-to-$Ta_2O_5$ ratio of usually about 8.5 or 10 to 1. Pyrochlore is a complex oxide which occurs in alkalic rocks containing essentially calcium, sodium, columbium, and tantalum with hydroxol and fluorine. If the acid earth present is predominantly columbium, the mineral is pyrochlore, and if predominantly tantalum, the mineral is microlite. All or part of the calcium and sodium may be replaced by other elements such as barium, strontium, rare earths or thorium. The $Cb_2O_5$ to $Ta_2O_5$ ratio is 20 to 1 and may be as high as 100 or 200 to 1 in the ore concentrate.

The columbium values are presently concentrated by ore beneficiation processes employing techniques which take advantage of the specific gravity differences as well as particle surface chemistry. The gravity process may involve "jigging" or "tabling" while froth flotation takes advantage of the differences in the particle surface chemistry in various minerals to be separated.

In the art, it is known that the columbian values must be taken into an aqueous solution to effect high purification or must be subjected to procedures involving volatile compounds of the columbium values, such as chlorination where the dry columbium concentrate is contacted with a chlorine-containing compound under reducing conditions and at elevated temperatures to volatilize a columbium chloride compound.

Also, according to known procedures in the art, the treatment of the columbium concentrate involves aqueous leaching of the concentrate with nitric and hydrofluoric acid, baking with sulfuric acid followed by aqueous leaching, or fusion with a caustic. The final purification is usually obtained either by a solvent extraction process or hydrolysis technique. The fusion technique is employed for cracking the mineral for subsequent processing. This latter process is not only expensive, but high purification is not obtained and many impurities remain with the columbium values.

It has generally been found that the process which yields the highest grade product is the hydrofluoric acid leaching system followed by a solvent extraction purification. The disadvantage of this process is the high reagent cost resulting from hydrofluoric acid used for dissolving the columbium values as well as that hydrofluoric acid consumed during the solvent extraction purification.

It is an object of the present invention to provide a process which overcomes the disadvantages of the prior art processes, particularly in that the process does not require the use of large quantities of solutions to provide a high recovery of columbium from various ores and concentrates.

Another object of the present invention is to provide a process for increasing the columbium concentration in stock solutions.

In accordance with the present invention the columbium-containing material after being ground and, optionally, baked with sulfuric acid, is treated by the addition of ammonia or an alkali metal hydroxide to a pH greater than 7.0. By this treatment, the concentrate is conditioned and the columbium values are "fixed" or rendered amenable to extraction. Alkali metal hydroxides, such as sodium hydroxide, potassium hydroxide, and the like, are effective in fixing the columbium values to achieve a high concentration of columbium in the resulting aqueous solutions.

It has unexpectedly been found that by treating, i.e., fixing, the acid-baked columbium-containing material with ammonia or alkali metal hydroxide less water is required in the final recovery step to obtain a higher concentration of columbium. Also, the columbium recovery is increased employing such a fixing step. Moreover, if the fixing step is carried out with an excess of alkali metal hydroxide and heating, a straight concentrate, i.e., one which has not been baked with acid, can be used as the starting material.

In accordance with one aspect of the present invention, the concentrate of the material containing the columbium values is first ground and then is mixed with a sulfuric acid and baked at a desired temperature for a specified period of time. If the concentrate is to be heated with alkali metal hydroxide and fixed, this acid-baking step can be eliminated. The particle size varies for different materials and is dependent upon the mineralogy of the particular material from which the columbium is to be separated.

In that aspect of the invention using an acid-baking first step, after the columbium-containing material has been baked with sulfuric acid, it is leached with water to effect a preliminary purification and then ammoniated by the addition of ammonia to provide a material of a pH greater than 7.0. During the process of being treated with ammonia, the system is heated at a suitable temperature and it is filtered and washed to obtain an ammonium sulfate solution and a wet cake containing the fixed columbium values.

The ammonia-treated wet cake is then mixed with a concentrated acid such as hydrochloric acid. The acidification concentrate mixture is then heated to dissolve the columbium values. The columbium is now water soluble in form but may not be all in solution, depending on the acid concentration. The excess acid may be evaporated to a mass of one-half the volume if desired.

After cooling, the columbium can be dissolved with the addition of water. Accordingly, the resulting solution can be processed for columbium recovery and purification.

The concentrate from which the columbium values are recovered may consist of various oxides including $Cb_2O_5$, $SiO_2$, $TiO_2$, $Fe_2O_3$, $CaO$, $BaO$, $PbO$, $ThO_2$, $U_3O_8$, and $ZrO_2$ and rare earth oxides. The largest amount of oxides in the concentrate is generally that of $Cb_2O_5$ and alkali earth oxides. The recovery of the columbium values in the hydrolyzed product may range as high as 95 percent or more.

The sulfuric acid which is baked with the concentrate is mixed therewith in a ratio of about 1 to 5 parts per part of columbium oxide present in the concentrate.

The leaching of the sulfuric-baked material may be accomplished by conventional means with water in which system there is between 50 and 10 percent solids present.

The fixing with ammonia or alkali metal hydroxide of the acid-baked concentrate may be performed simultaneously with that of the leaching process with water. However, it is generally preferred that the fixing will take place subsequent to the leaching. The fixing is performed preferably with the system consisting of between 50 and 10 percent solids. The amount of ammonia or alkali metal hydroxide that may be used is between 0.2 to 1.0 parts per part of columbium oxide present in the concentrate.

As is mentioned above, instead of ammonia, the alkali metal hydroxides, such as sodium hydroxide and potassium hydroxide, and the like, are also effective in "fixing" the columbium values. In either case, an excess is added, i.e., enough to bring the pH to greater than 7.0.

In accordance with one aspect of this invention, the treatment of the ammoniated or caustic-treated filter cake is with an acid such as hydrochloric acid. The treatment with the hydrochloric acid is performed with the system having between 50 and 5 percent solids. The molar concentration of the hydrochloric acid is suitably between 6 and 14 molar, preferably the range is between 8 and 10 molar. The amount of HCl that should be used is at least about 4.0 moles per mole of columbium oxide, preferably from 4.5 to 5.0 moles of HCl.

After the filter cake has been treated with hydrochloric acid, the original volume may be evaporated by an amount of between 0 and 80 percent. It is generally preferable to evaporate only up to 50 percent of the original volume for advantageous results.

An important feature of one aspect of the present invention is in providing a process which uses less hydrochloric acid to treat the solid filter cake to obtain the maximum amount of columbium values. This is brought about by the ammoniation or caustic treatment of the aqueous-leached baked concentrate. In some cases, the return of the columbium as $Cb_2O_5$ may be as high as 300 grams/liter, however, it is preferable to have the columbium in the amount of between 100 and 150 grams/liter of solution for an efficient liquid-solid separation.

The various process steps of the present process are performed under varying temperature conditions.

In the embodiment using acid-baked concentrate as a starting material, the ore concentrate is baked with sulfuric acid in a temperature range of between 175° to 400° C. The ammoniation or caustic treatment fixing step is carried out in a temperature range of between 25° and 110° C., and preferably in the range of 50° to 80° C. The treatment of the ammoniated or caustic-treated filter cake with hydrochloric acid is performed in a temperature range of about 20° to 110° C.

In the embodiment using ore concentrate as the starting material (and no acid-baking step), the treatment with excess alkali metal hydroxide is carried out at a temperature sufficiently high to fix the columbium values in the form of an alkali metal-columbium complex salt which is amenable to extraction in high concentrations in aqueous media. It is preferred to heat at a temperature of above about 400° C. for a sufficient time, e.g., at least more than about one-half hour. Preferred conditions are temperatures of from about 500° C., preferably 650° C., to 750° C. for at least about 1 hour.

This embodiment in essence comprises a. heating a columbium concentrate, as defined above, with an excess of an alkali metal hydroxide, i.e., at least enough to give a pH of 7.0, and preferably with from about 0.5 to 3.0 pounds, especially preferably 1.25 to 1.50 pounds, of alkali metal hydroxide per pound of $Cb_2O_5$ in the concentrate until the columbium values therein are fixed in an alkali metal-columbium complex;

b. aqueously leaching the product of step (a) with enough water to dissolve impurities but not enough water to dissolve a substantial amount of the columbium values fixed in the complex and separating a solution of the impurities; and c. aqueously leaching the product of step (b) to provide a solution of the columbium values.

As an illustration of the technique, the concentrated raw material after mixing with sodium hydroxide (water can be added to facilitate handling, for example, to make a paste) is heated at 550°–750° C. for 0.5–2 hours. Other materials can also be added, such as sodium sulfate or sodium carbonate. After cooling, the product is ground and leached, preferably at ambient temperatures (25°–25° C.), for about 15 minutes to 3 hours at about 20–35 percent solids. The slurry is filtered and washed with sufficient water such that no columbium values are solubilized. The wash water amounts to about 50–70 percent of the original water used to leach the ground material. The filter cake solids contain about 40–50 percent water. Typically, after drying at 120° C. for 16 hours, it will contain about 35 percent $Cb_2O_5$. The wet filter cake containing the columbium values is added to sufficient water at 96° C. to dissolve the complex and leached for about 1 hour after which the insoluble solids are removed leaving the columbium values in the aqueous concentrated stock solution.

The columbium values can be recovered from the stock solution in a number of ways. Cooling will cause precipitation. Adding either alkali metal hydroxide, e.g., sodium hydroxide, e.g., to pH of 12.0, or mineral acid, e.g., hydrochloric acid, to pH 7.0 or below, with or without cooling, also will precipitate the values and will facilitate recovery from the aqueous concentrated stock solution.

It is preferred to add an alkali metal hydroxide, e.g., sodium hydroxide, to the concentrated stock solution and to cool, e.g., at 0°–25° C. preferably about 8° C., until precipitation of the columbium values is substantially complete and recover the precipitate.

Optionally, to remove occluded impurities, the precipitate can be leached with aqueous mineral acid, e.g., 15 percent hydrochloric e.g., or nitric acid.

Optionally, the final product is recovered by calcining in a suitable apparatus, i.e., a calcining furnace, at a high temperature, e.g., from 350° to 1,000° C., preferably at about 600° C. until the product, substantially pure columbium oxide, reaches a constant weight.

DESCRIPTION OF THE PREFERRED EMBODIMENTS

The invention is illustrated by the following examples; they are not intended to limit the scope of the claims in any manner whatsoever.

EXAMPLE 1

A sample of flotation concentrate obtained from beneficiating an ore sample from Araxa, Brazil and analyzing as presented in Table 1 is subjected to that process of this invention which uses an acid-baking step. 100 grams of concentrate (100 percent passing 100-mesh sieve) is mixed with 100 grams of sulfuric acid ($H_2SO_4$, 96%) and baked at 350° C. for 1.5 hours. Subsequently, the baked material is leached in water at 20 percent solids (based on original concentrate weight fed to the system) at 27° C. for 1 hour and filtered to remove sulfate impurities. Some iron and other impurities are also removed during this aqueous leaching operation. The next step of the process is to mix the wet filter cake originating from the sulfate removal step with an ammonia solution containing 250 g./l. $NH_3$ at 50 percent solids (based on original concentrate weight fed to the system) and agitated at 75° C. for 1 hour after which the concentrate is subjected to filtration from which originates an ammonium sulfate solution product capable of fertilizer potential of the following analysis (material obtained from evaporation of the solution) by semiquantitative X-ray spectrographic methods.

| Constituent | Percent |
|---|---|
| Fe | 0.027 |
| Cb | 0.014 |

The ammoniated filter cake is mixed with hydrochloric acid and water to result in a slurry containing 8.5 molar HCl (based on aqueous in the system) and 28.2 percent solids (based on original concentrate weight fed to the system) and subjected to evaporation at 96° C. until the volume of the original system is decreased by 50 percent. Following this evaporation step the system is cooled and diluted with water to result in an aqueous solution containing 148 g./l. $Cb_2O_5$ and filtered to remove the solids which are substantially barium sulfate. The resulting solution is subjected to hydrolysis to result in a product analyzing as presented in Table 2.

| | Table 1 | | Table 2 | |
|---|---|---|---|---|
| | Concentrate Analysis | | Product Analysis | |
| Constituent | Percent | Constituent | | Percent |
| $Cb_2O_5$ | 58.0 | $Cb_2O_5$ | | major |
| $SiO_2$ | 1.0 | Pb | | 0.040 |
| $TiO_2$ | 4.6 | Fe | | 0.041 |
| $Fe_2O_3$ | 1.5 | Ti | | 0.68 |
| $Re_2O_3$ | 4.0 | Zr | | 0.94 |
| BaO | 14.0 | Th | | 0.06 |
| PbO | 0.8 | Ta | | 0.042 |
| $ThO_2$ | 1.8 | | | |
| $U_3O_8$ | 0.5 | | | |
| $ZrO_2$ | 0.4 | | | |

The recovery of the columbium values into the hydrolyzed product during this procedure is 97.5 percent.

EXAMPLE 2

A sample of concentrate obtained from beneficiating an ore sample from the St. Laurence area in Canada is subjected to the process of this invention. A semiquantitative X-ray spectographic analysis of this concentrate appears in Table 3.

TABLE 3

| Element | Percent | Element | Percent |
| --- | --- | --- | --- |
| Cu | 0.086 | Cr | 0.60 |
| Zn | 0.021 | U | 0.22 |
| Pb | 0.063 | Mn | 0.41 |
| Fe | 0.87 | La | 1.7 |
| Ni | 0.041 | Ce | 8.2 |
| Ti | 0.60 | Pr | 0.22 |
| Zr | 2.1 | Nd | 0.21 |
| Th | 0.34 | Y | 0.80 |
| Cb | 29.0 | | |
| Ta | 1.1 | | |

100 grams of concentrate is mixed with 100 grams of sulfuric acid and baked at 350° C. for 2.0 hours. The dry concentrate is ground to pass a 200-mesh sieve. The baked material is leached in water at 23 percent solids (based on original concentrate weight fed to the system) at 60° C. for 1 hour. A liquid-solid separation is performed to remove soluble sulfate and iron. The filter cake is subsequently mixed with a solution containing 250 g./l. $NH_3$ at 50 percent solids (based on original concentrate weight fed to the system) at 75° C. for 1 hour. Again, a liquid-solid separation is performed with sufficient washing of the filter cake to achieve a sulfur content of the ammoniated solids of 3.1% S. The ammoniated cake is leached with a hydrochloric acid solution (8.8 molar) at 28 percent solids (based on original concentrate weight fed to the system) at 95° C. for 1.5 hours. Heat is supplied to the system until the volume of the slurry is 50 percent of the original volume. The system is then diluted to result in approximately 130 g./l. $Cb_2O_5$ prior to liquid-solid separation and analysis to determine columbium recovery. The recovery of columbium obtained during this experiment is 63.6 percent. It can be noted that although the recovery is relatively low, the process of this invention is still applicable to a material containing columbium values which analyzes differently from the material employed in Example 1. A semiquantitative X-ray spectographic analysis of columbium oxide material recovered from a hydrochloric acid solution is presented in Table 4.

TABLE 4

| Element | Percent |
| --- | --- |
| Fe | 0.032 |
| Ti | 0.82 |
| Zr | 0.88 |
| Th | 0.033 |
| Cb | major |
| Ta | 0.55 |

EXAMPLE 3

The temperature limits during the sulfuric acid baking operation are studied to investigate both subsequent filtration characteristics of the filter cake as well as recovery of columbium values into the hydrochloric acid system. The solubility of the columbium values into an oxalic acid solution is used as a measure of baking temperature efficiency and effectiveness in "cracking" the material. One hundred grams of columbium concentrate are mixed with sulfuric acid and baked for 2 hours at various temperatures. The baked material is water leached at 20 percent solids for 1 hour to remove excess sulfate and filtered, after which the filter cake is contacted with an $NH_4OH$ solution (250 g./l. at 30 percent solids (based on original concentrate weight fed to the system) at 80° C. for 1 hour. The slurry is filtered and the cake washed by repulping in fresh water and refiltering. The cake is then contacted with oxalic acid solution (80 g./l.) at 20 percent solids at 90° C. for 15 minutes, then filtered and the filtrate analyzed for columbium content. Table 5 presents the data obtained from this experiment.

TABLE 5

| Baking Temperature °C. | Columbium Values Dissolved During Oxalic Acid Leach % |
| --- | --- |
| 175 | 60 |
| 250 | 80 |
| 275 | 84 |
| 300 | 98 |
| 350 | 100 |
| 400 | 74 |

EXAMPLE 4

The quantity of sulfate remaining in the ammoniated filter cake is determined to study its effect on subsequent handling of the material during the hydrochloric acid leach relative to settling and filtration of the solids as well as columbium recovery during the hydrochloric acid leach. The ammoniated filter cake is subjected to various stages of repulping filtration and washing before analysis for sulfur content prior to leaching with hydrochloric acid. The hydrochloric acid leaching step is performed by mixing 54 grams of the ammoniated cake (dry basis) with 111 milliliters of 9.8 molar HCl and evaporated at 95° C. until the volume has reached 50 percent of the original volume. The evaporated material is diluted at 20° C. to achieve a columbium oxide concentration of approximately 150 g./l. $Cb_2O_5$ prior to liquid-solid separation and chemical analysis. Table 6 presents the data obtained from this experiment. It can be noted that although recovery of columbium values into the hydrochloric acid is not affected appreciably by the amount of sulfur remaining in the ammoniated cake, the clarity of supernatant solution is adversely affected by high sulfur.

TABLE 6

| Sulfur Remaining in Ammoniated Cake (Dry Basis) % | Columbium Recovery During Hydrochloric Acid Leach % |
| --- | --- |
| 7.4 | 92 (difficult to obtain clear solution) |
| 4.8 | 98 (difficult to obtain clear solution) |
| 3.2 | 100 (clear solution) |
| 2.8 | 100 (clear solution) |

EXAMPLE 5

The concentration of hydrochloric acid has a marked effect on the columbium solubility as presented in Table 7.

TABLE 7

| HCl Concentration in Aqueous Phase | $Cb_2O_5$ Concentration in Aqueous Phase |
| --- | --- |

| (Molarity) | (g./l.) |
|---|---|
| 3.18 | 302 |
| 4.55 | 118.8 |
| 6.7 | 58.7 |
| 7.25 | 45 |
| 8.66 | 31.2 |
| 11.15 | 10.7 |
| 11.76 | 8.55 |

The data in Table 7 are developed by evaporating a sample of HCl-columbium solution obtained from processing the ammoniated cake to dryness at room temperature, then adding water until only a slight insoluble remains, which is centrifuged for separation of liquids and solids. Samples of this solution are added to various concentrations of HCl until a permanent precipitate remained. The precipitate is centrifuged for separation of solids and the clear solution analyzed for columbium and HCl

EXAMPLE 6

A sample of flotation concentrate obtained from beneficiating an ore sample from Araxa, Brazil and analyzing as presented in Table 1 is subjected to the process of this invention. One hundred grams of concentrate (100 percent passing 100-mesh sieve) are mixed with 100 grams of sulfuric acid ($H_2SO_4$, 96%) and baked at 350° C. for 1.5 hours.

The baked material is then ground to a powder and stirred in water at 35 percent solids (based on the weight of original concentrate). Thirty grams of sodium hydroxide solid are added to this slurry which causes the temperature to rise to the boiling point. The mixture is stirred for 30 minutes and filtered and the cake is washed with 175 g./l. sodium chloride solution. The filtrate and wash solution contain 0.19 grams of $Cb_2O_5$ which represents 0.65 percent of the $Cb_2O_5$ present in the original concentrate.

The washed cake is mixed with hydrochloric acid and water to result in a slurry containing 8.5 molar HCl (based on the aqueous in the system) and subjected to evaporation at 96° C. until the volume of the original system is reduced by 50 percent. Following this evaporation step the system is cooled and diluted with water to result in an aqueous solution containing 168.8 g./l. $Cb_2O_5$ which represents over 98 percent of the columbium contained in the original concentrate.

EXAMPLE 7

An ore from Araxa, Brazil is concentrated by flotation and contains, in percent by weight: $Cb_2O_5$, 58.0; $SiO_2$, 1.0; $TiO_2$, 4.6; $Fe_2O_3$, 1.5; BaO, 14.0; and $ZrO_2$, 0.4. The concentrate is ground (100 percent passing 100-mesh sieve) and mixed with 170–190 grams of sodium hydroxide per 250 g. of concentrate, for 30 minutes, enough water being added to form a thin paste. The mixture is roasted at 600° C. for 4 hours.

The roasted cake is cooled and leached in three stages with water. In the first-stage leach, for each 250 g. of original filter cake, 1 liter of water is added and the mixture is agitated at 75° C. for 4 hours. In the second-stage leach, for each 250 g. of original filter case, 3 liters of water is added and the mixture is agitated at 95° C. for 4 hours. In the third-stage leach, the same conditions as in the second stage are used. The slurries from the leaches are filtered with vacuum to provide stock solutions containing columbium values. The second leach provides a concentrated aqueous solution with 13.6 to 22.6 g./l. $Cb_2O_5$ concentration, by analysis.

Four procedures are used to recover the columbium values:

1. The filtrate from the second leach is cooled to 0° C. and the columbium values precipitate and are recovered by filtration.
2. The filtrate from the second leach is cooled to 25° C. and the columbium values are precipitated.
3. The filtrate from the second leach is cooled to 8° C. until precipitation of the columbium values is substantially complete, and these are recovered by filtration.
4. The filtrate from the second leach is treated with an excess of sodium hydroxide and cooled to 8° C. until precipitation of the columbium values is substantially complete, and these are recovered by filtration.

Columbium values of high purity are obtained by calcining the products of (1), (2), (3) and (4) at 600° C. to constant weight.

Columbium values of exceptionally high purity are obtained by leaching the product of steps (1), (2), (3) and (4) with 15% HCl or $HNO_3$ and filtering and drying. The use of HCl to leach product (2) gives $Cb_2O_5$ of 99%+purity. $HNO_3$-leached product (1) is greater than 99.5 percent pure, as is the $Cb_2O_5$ of HCl-leached product (4).

EXAMPLE 8

A columbium concentrate is prepared according to the procedure of Example 7.

The concentrate is mixed under the conditions of Example 7 with 1.25 parts by weight of sodium hydroxide per part of contained $Cb_2O_5$ (by analysis) and the pasty mixture is roasted at 700° C. for 2 hours.

After roasting, the product is ground and leached with water at 25°–35° C. for 15 minutes at 27 percent solids. The slurry is filtered and the solids are washed with an amount of water small enough not to dissolve columbium values. The amount of wash water is 60 percent of that used to leach the ground, roasted product.

The filtered solids contain about 45 percent water. A portion of the wet cake dried at 120° C. for 16 hours contains 34.5% $Cb_2O_5$.

The wet-filtered solids containing columbium values are leached with water at 5–10 percent solids at 96° C. for 1 hour. The insoluble solids are recovered and the columbium values remain in the aqueous concentrate.

The $Cb_2O_5$ dissolved in the aqueous concentrate is 93.5 percent of that in the starting material.

The columbium values are recovered by adding excess sodium hydroxide to the aqueous solution, cooling to 8° C. until precipitation is complete, recovering the precipitate, leaching it with 15 percent hydrochloric acid and calcining the leached solids at 600° C.

EXAMPLE 9

The procedure of Example 8 is repeated, using 500° and 600° C. roasting temperatures instead of 700° C. The $Cb_2O_5$ dissolved in the aqueous concentrate is 70.5 and 93.0 percent, respectively, of that in the starting material. The procedure of Example 8 is repeated adding 0.224 pound of sodium carbonate per pound of $Cb_2O_5$ to the mixture. The $Cb_2O_5$ dissolved in the aqueous concentrate is 88.5 percent of that in the starting material.

EXAMPLE 10

The procedure of Example 8 is repeated, roasting the following mixtures under the indicated process conditions:

| | Parts by Weight |
|---|---|
| Columbium concentrate as $Cb_2O_5$ (per procedure Example 7) | 1.00 |
| Sodium hydroxide | 1.00–2.73 |
| Sodium sulfate | 0–0.5 |
| Sodium carbonate | 0–0.66 |
| Temperature | 550°–700° C. |
| Time | 0.5–2 hours |

After roasting, the products are ground and leached as described in Example 8 and aqueous concentrates of columbium values are obtained.

The $Cb_2O_5$ dissolved in the aqueous concentrates ranges from 68.0 to 99 percent of that in the starting material, and the amount recovered is relatively independent of whether or not sodium sulfate or sodium carbonate have been added.

EXAMPLE 11

A sample of flotation concentration from beneficiating a pyrochlore ore from Araxa, Brazil, with an analysis described in Example 1 is ground then roasted with sodium hydroxide according to this invention.

To the concentrate is added 1.25 parts of sodium hydroxide per part of contained $Cb_2O_5$ and enough water to make a paste. The mixing requires about 30 minutes.

The paste is roasted at 700° C. for 2 hours.

The product is ground and leached with a first portion of water at ambient temperatures (25°–35° C.) for 15 minutes at 27 percent solids. The slurry is filtered and washed with an amount of water insufficient to dissolve columbium values (60 percent of the first portion of leach water).

The filter cake is releached with a second portion of water, enough to give a 15- to 20-g./l. $Cb_2O_5$, for 1 hour at 96° C. to solubilize the columbium values and provide, after filtration, an aqueous concentrate thereof.

Sodium hydroxide, one to two parts per part of contained $Cb_2O_5$, is added to the aqueous concentrate and the mixture is cooled to 8° C. until precipitation of the columbium values is substantially complete.

The precipitated columbium values are leached with 15 percent hydrochloric acid to remove occluded impurities and excess sodium values.

The leached precipitate is calcined at 600° C. to obtain substantially pure $Cb_2O_5$.

Alternatively, addition of hydrochloric acid to the aqueous concentrate to a pH of 7.0 or less is used to precipitate the columbium values in a hydrated form.

From the foregoing description and examples, it is obvious that a simple and efficient method of recovering and purifying the columbium values in a concentrate has been discovered.

Obvious modifications will suggest themselves to those skilled in the art. For example, the process has been described as applicable to columbium values in columbite and pyrochlore ores. However, the teachings herein will be applicable as well for other ores and concentrates therefrom such as tantalite, microlite, simpsonite, samarskite, fergusonite, tapiolite, euxenite, ilmeno-rutile, and the like. The teachings are also applicable in the separation and recovery of metal values closely associated by reason of common occurrence with columbium, such as tantalum, and the like.

We claim:

1. A process for recovering columbium values from a columbium concentrate comprising:
   a. heating a columbium concentrate with an excess of an alkali metal hydroxide until the columbium values therein are fixed;
   b. aqueously leaching the product of step (a) in at least two separate stages, the first to solubilize impurities and to separate them, the second and subsequent stages to solubilize the columbium values; and
   c. recovering the columbium values from the second and subsequent stages.

2. A process as defined in claim 1 wherein step (a) is carried out at a temperature of from about 500° to about 750° C.

3. A process as defined in claim 2 wherein step (b) is carried out in at least two separate stages, the first to solubilize impurities and to separate them, and the second and subsequent stages to solubilize the columbium values.

4. A process as defined in claim 3 wherein step (c) comprises cooling the aqueous solution of columbium values of step (b) until precipitation of the columbium values is substantially complete and separating said precipitated columbium values.

5. A process as defined in claim 4 including the step of leaching the precipitate with mineral acid to remove occluded impurities.

6. A process as defined in claim 4 including the step of adding an excess of alkali metal hydroxide or an excess of mineral acid to assist in the precipitation of the columbium values.

7. A process as defined in claim 1 comprising:
   a. heating a columbium concentrate with an excess of an alkali metal hydroxide at a temperature of from about 650° to about 750° C. until the formation of an alkali metal-columbium complex salt is substantially complete;
   b. aqueously leaching the product of step (a) with enough water to dissolve impurities but not enough water to dissolve a substantial amount of said complex and separating an aqueous solution of said impurities;
   c. aqueously leaching the product of step (b) to provide an aqueous solution of said complex;
   d. adding an alkali metal hydroxide to the solution of step (c), cooling until precipitation of the columbium values is substantially complete and recovering said precipitate;
   e. treating the precipitate of step (d) with mineral acid to remove occluded impurities; and
   f. calcining the final product of step (e) to obtain the final product.

8. A process for the recovery of columbium values from a columbium concentrate comprising:
   a. heating a columbium concentrate with an excess of an alkali metal hydroxide at a temperature of above 400° C. until the columbium values therein are fixed;
   b. leaching the product of step (a) in at least two separate stages, with water, the first to solubilize impurities and to separate them, and the second and subsequent stages to solubilize the columbium values;
   c. recovering the columbium values from the resulting solution of step (b).

9. A process comprising:
   a. heating a columbium concentrate with from 0.5 to 3 parts of alkali metal hydroxide per part of $Cb_2O_5$ in the concentrate at a temperature of from about 500° to about 750° C.;
   b. aqueously leaching the product of step (a) in at least two separate stages, the first to solubilize impurities and separate them, and the second and subsequent stages to solubilize the columbium values; and
   c. recovering the columbium values from the solution of step (b).

10. A process as defined in claim 9 wherein step (c) comprises cooling the aqueous solution of columbium values of step (b) until precipitation of the columbium values is substantially complete and separating said precipitated columbium values.

11. A process as defined in claim 9 including the step of leaching the precipitate with mineral acid to remove occluded impurities.

12. A process as defined in claim 9 including the step of adding an excess of alkali metal hydroxide or an excess of mineral acid to assist in the precipitation of the columbium values.

13. A process as defined in claim 9 comprising:
   a. heating a columbium concentrate with an excess of an alkali metal hydroxide at a temperature of from about 650° to about 750° C. until the formation of an alkali metal-columbium complex salt is substantially complete;
   b. aqueously leaching the product of step (a) with enough water to dissolve impurities but not enough water to dissolve a substantial amount of said complex and separating an aqueous solution of said impurities;
   c. aqueously leaching the product of step (b) to provide an aqueous solution of said complex;
   d. adding an alkali metal hydroxide to the solution of step (c), cooling until precipitation of the columbium values is substantially complete and recovering said precipitate;
   e. treating the precipitate of step (d) with mineral acid to remove occluded impurities; and
   f. calcining the final product of step (e) to obtain the final product.

* * * * *